United States Patent [19]

Bales et al.

[11] Patent Number: 5,268,055

[45] Date of Patent: Dec. 7, 1993

[54] METHOD FOR MAKING PERFORATED COMPOSITE LAMINATES

[76] Inventors: John L. Bales, 1035 N. Custer, Wichita, Kans. 67203; Daniel A. Buchacher, 244 10th Ave., Kirkland, Wash. 98033; Clint A. Luttgeharm, 6516 Renee Ct., Wichita, Kans. 67212; Douglas A. McCarville, 23310 61st Ave. S., No. BB-302, Kent, Wash. 98032

[21] Appl. No.: 786,157

[22] Filed: Oct. 31, 1991

[51] Int. Cl.⁵ .............................. B29C 43/02
[52] U.S. Cl. .................. 156/252; 156/73.6; 156/245; 156/253; 156/513; 264/156; 425/290
[58] Field of Search ........ 156/73.6, 242, 245, 156/252, 285, 513, 253; 264/69, 156, 257, 258; 425/290

[56] References Cited

U.S. PATENT DOCUMENTS

| | | |
|---|---|---|
| 2,289,177 | 7/1942 | Chandler . |
| 3,704,194 | 7/1970 | Harrier . |
| 3,746,589 | 7/1973 | Reinke .............................. 264/69 X |
| 3,787,546 | 1/1974 | Pratt et al. ...................... 156/242 X |
| 4,132,519 | 9/1979 | Reed . |
| 4,211,590 | 7/1980 | Steward et al. . |
| 4,486,372 | 12/1984 | Millard et al. . |
| 4,614,553 | 9/1986 | Allred . |

FOREIGN PATENT DOCUMENTS

| | | |
|---|---|---|
| 60-11320 | 1/1985 | Japan ................................... 264/156 |
| 799072 | 7/1958 | United Kingdom . |

*Primary Examiner*—Jeff H. Aftergut

[57] ABSTRACT

A novel method and apparatus are provided for consolidating and perforating multilayer laminates by a combination of vibratory motion and impacting pressure applied by a special compacting tool preparatory to final cure.

5 Claims, 6 Drawing Sheets

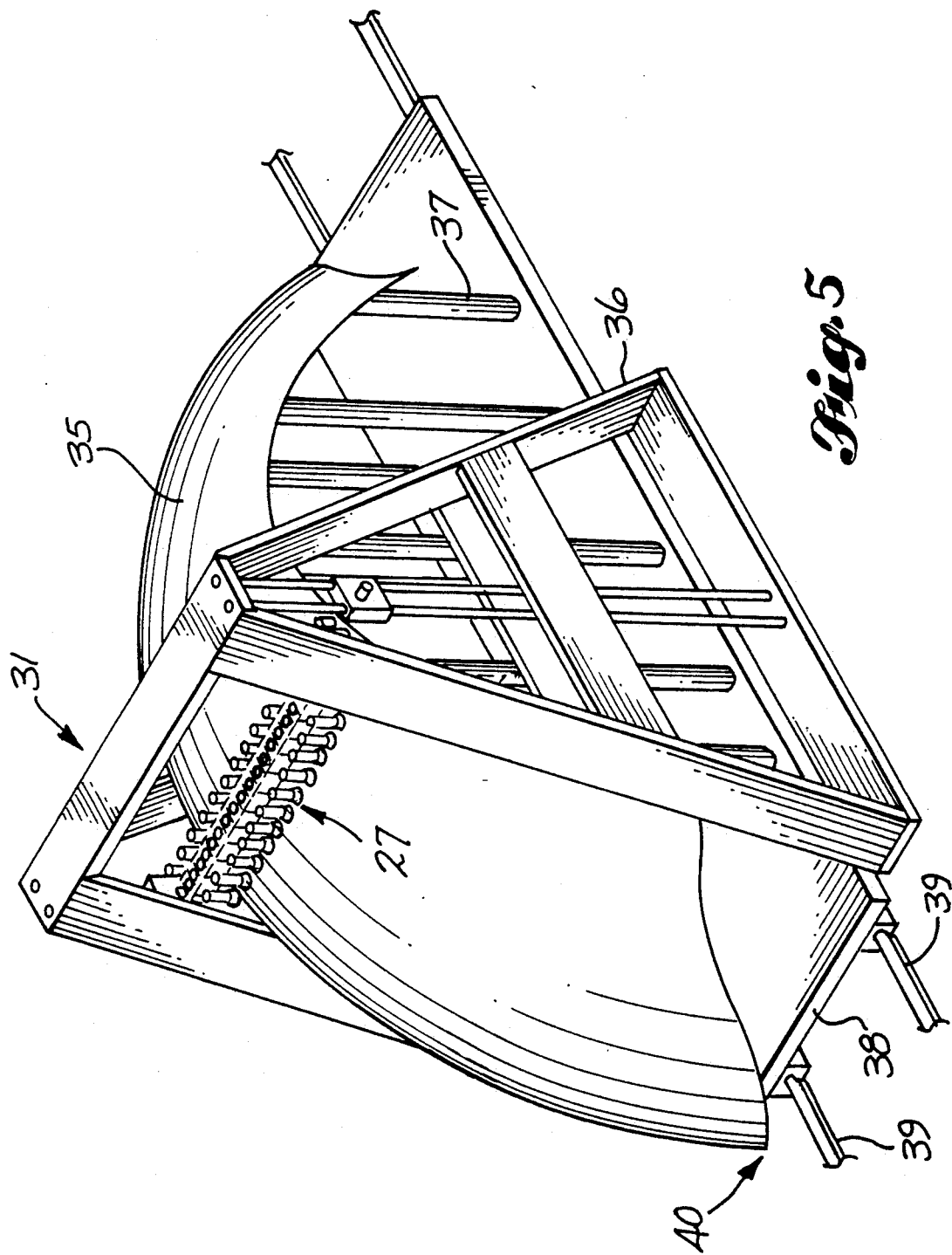

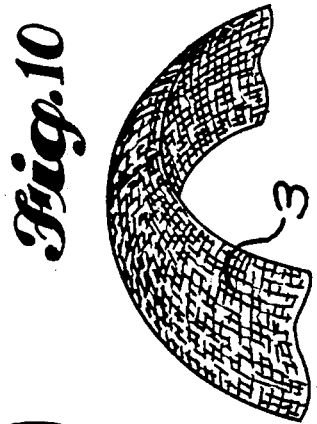
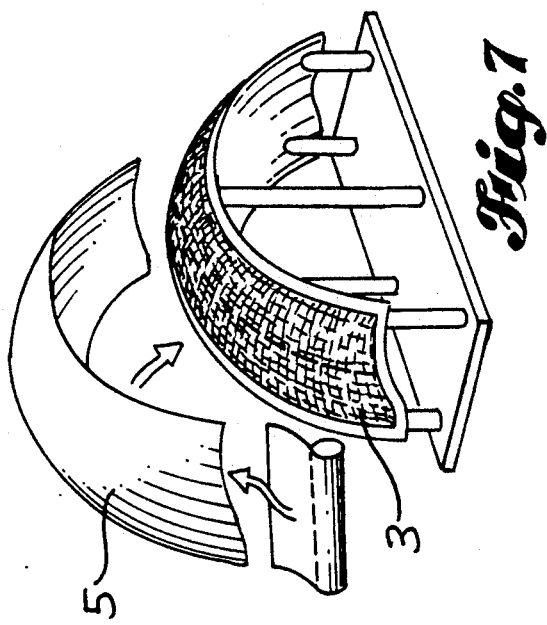
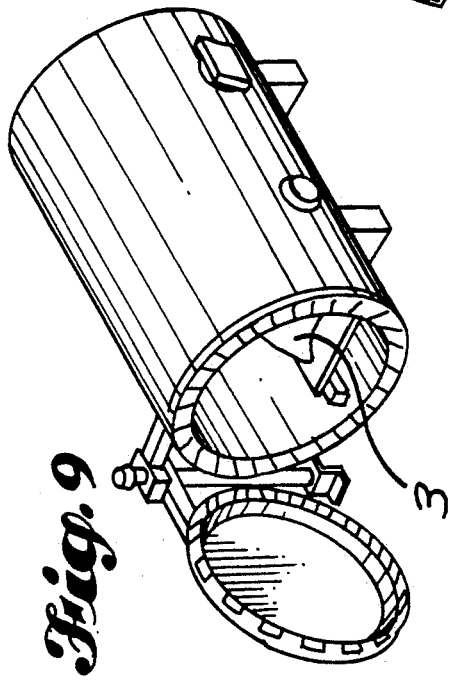
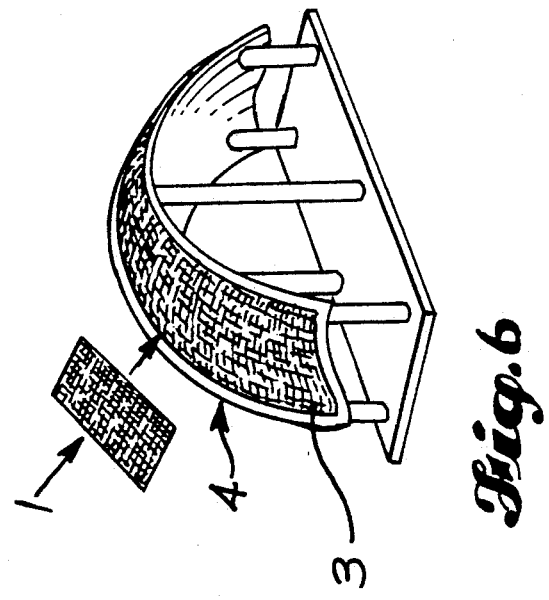
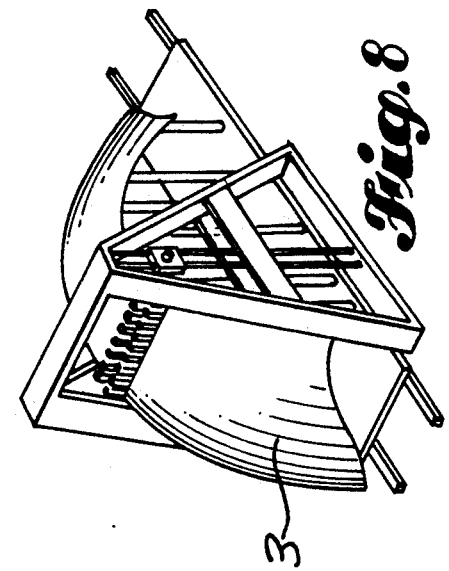

METHOD FOR MAKING PERFORATED COMPOSITE LAMINATES

This invention relates to a method and apparatus for making perforated composite laminates. More particularly, the invention relates to debulking multilayer laminates and concurrently forming perforations by a novel combination of vibratory motion and impacting pressure preparatory to final cure.

BACKGROUND

The use of composite structures in lieu of aluminum for commercial aircraft offers potential weight savings and performance improvements. One application where the use of composites is preferred is engine nacelle acoustical linings. The perforated structure of such linings helps attenuate engine noise.

Currently, nacelle acoustical linings for Boeing TM commercial aircraft are based on aluminum sandwich construction. The linings consist of an aluminum face sheet bonded to an aluminum honeycomb core and backed with a bonded, load carrying perforated inner skin. Other aircraft manufacturers make perforated backings by patching several perforated laminated composite sections together. This option has been unattractive to the Boeing Company in the past because of its nacelle load carrying requirements and the difficulty of making very large acoustical linings with complex contours.

Methods of making large, perforated, composite panels by conventional vacuum bagging and perforation techniques were considered. These included impregnating open hold fabric with resin, using a large vacuum press with either hard or soft tooling, filament winding and resin impregnation, stamping lay-ups and resin transfer molding. All of these methods require expensive tooling. Moreover, because of the large size and complex contours of nacelle linings, the tooling for each of these methods was very expensive. It is also necessary to lay-up each sheet only one layer at time and then debulk preparatory to piercing and final cure. This is time consuming and, therefore, expensive.

Also considered were various ways of forming perforations in preformed sheets such as drilling, abrasion, stamping, water jet, laser beam and electron beams. Each of these methods causes damage to reinforcing fibers weakening the panel. To compensate for such weakening, thicker, heavier cross-sections would be required.

A method of making non-structural perforated fiberglass/epoxy skins is taught in U.S. Pat. No. 3,787,546 to Pratt et al. The method entails placing a partially cured plastic fiberglass reinforced sheet over injection molded plastic studs on a pin mandrel. A pressure transmitting blanket is laid over the sheet and the assembly is vacuum bagged. The studs push through the sheet during autoclaving without damaging the glass fibers of the reinforced sheet.

The process of the '546 patent is limited in ways which make it inappropriate for making large, contoured, multilayered structural laminates. For example, the pin mandrel and ply lay-up must be formed to contour. Any attempt to form a compound results in buckling of the pin mandrel. Where small pieces are joined together to make a larger piece, this is accommodated by manufacturing perforated sheets with excess size and cutting away buckled regions. The size of perforated sheets that can be made is limited by the size of molded pin mandrel which can be obtained and by the size of press available for perforating plies. If the press pressure is too great, the pins on the mandrel are squashed, do not perforate effectively, and are difficult to remove from the autoclaved sheet.

Accordingly, this invention overcomes the shortcomings of Prior art methods by providing a method and means for making very large, perforated, fiber-reinforced, multilayer laminates in an efficient and cost-effective manner.

BRIEF SUMMARY

In a preferred embodiment of the invention, a large perforated composite panel is formed by laying several layers of a fiber reinforced prepreg on a studded tool. The layers are compacted and the studs are pushed through the prepreg by application of oscillating, vibratory, impacting pressure to the prepreg through a pressure transmitting material. The prepreg is cured on the studded tool in an autoclave to a point at which no more resin flow is caused by additional heating. The prepreg is removed from the studded tool, trimmed and finally cured.

The invention will be better understood in view of the several figures and detailed description which follow.

DETAILED DESCRIPTION

FIG. 5 is a perspective view of a compacting apparatus for making a perforated engine nacelle.

FIGS. 6 to 10 are diagrammatic views of a processing sequence for making perforated engine nacelle panels in accordance with this invention.

Figure 1:
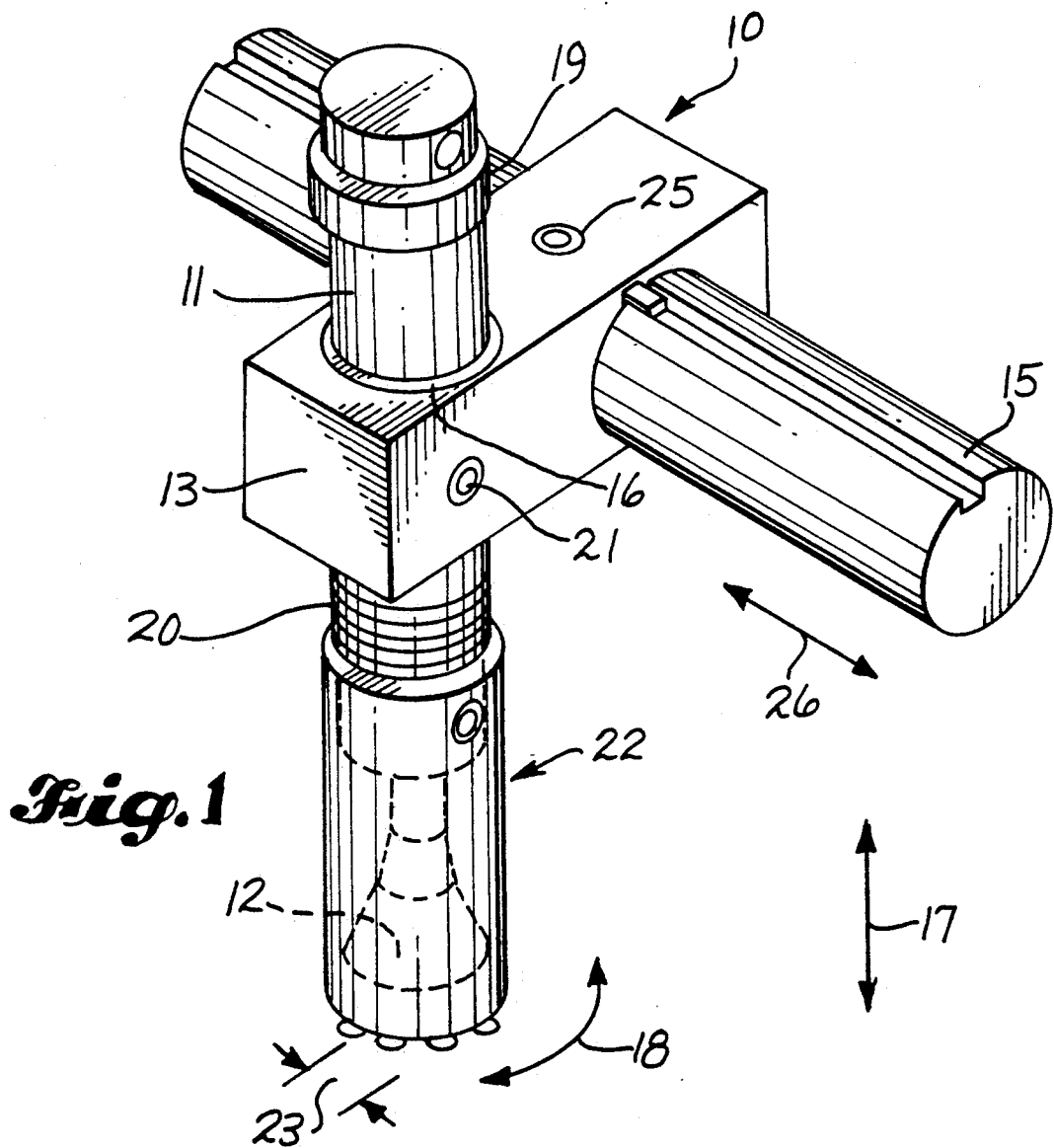
FIG. 1 is a perspective view of an impacting tool for compacting prepreg laminates on a tool.

FIG. 1 details an impacting tool setup (10) which applies the piercing force to the pressure/vacuum material (8) causing the prepreg (5) to be pushed onto the pin mandrels (1). The pressure is derived from an impacting tool (11). This tool (11) is similar to a rivet gun in operation. It oscillates 1000-2000 blows per minute and delivers an impacting force (in the preferred embodiment a 1¼ inch diameter bore tool is used) to the impacting head (12). The tool is held in a retention block (13). The block (13) is comprised of a keyway hole (14) that holds the setup firmly to a pivoting shaft (15) and a self-aligning bearing (16) that allows the impacting tool (11) to float vertically (17) and swivel (18) as required to align the impacting head (12) normal to the prepreg layup (5). These freedoms of movement allow each gun to move as needed to adjust for layup tool high spots, low spots, buildups and curvature. A retention ring (19) limits the impacting tools (11) vertical downward movement and a dampening spring (20) cushions vertical upward motion during oscillation. Retention screw (21) confines the impacting tools (11) swivelling movement (18) within predetermined limits. A roller ball assembly (22) screws on to the impacting tool (11). Its function is to maintain proper tool offset (23) between the impacting heads (12) and the pressure/vacuum material (8), thus insuring unimpaired impact head (12) oscillation. Further, it serves to align the tool (11) normal to the prepreg layup (5) and insure friction-free linear movement (24) along the layup tool. Retention screw (25) allows for side-to-side adjustment (25) of the impacting tool setup along the pivoting shaft (15).

Figure 2:
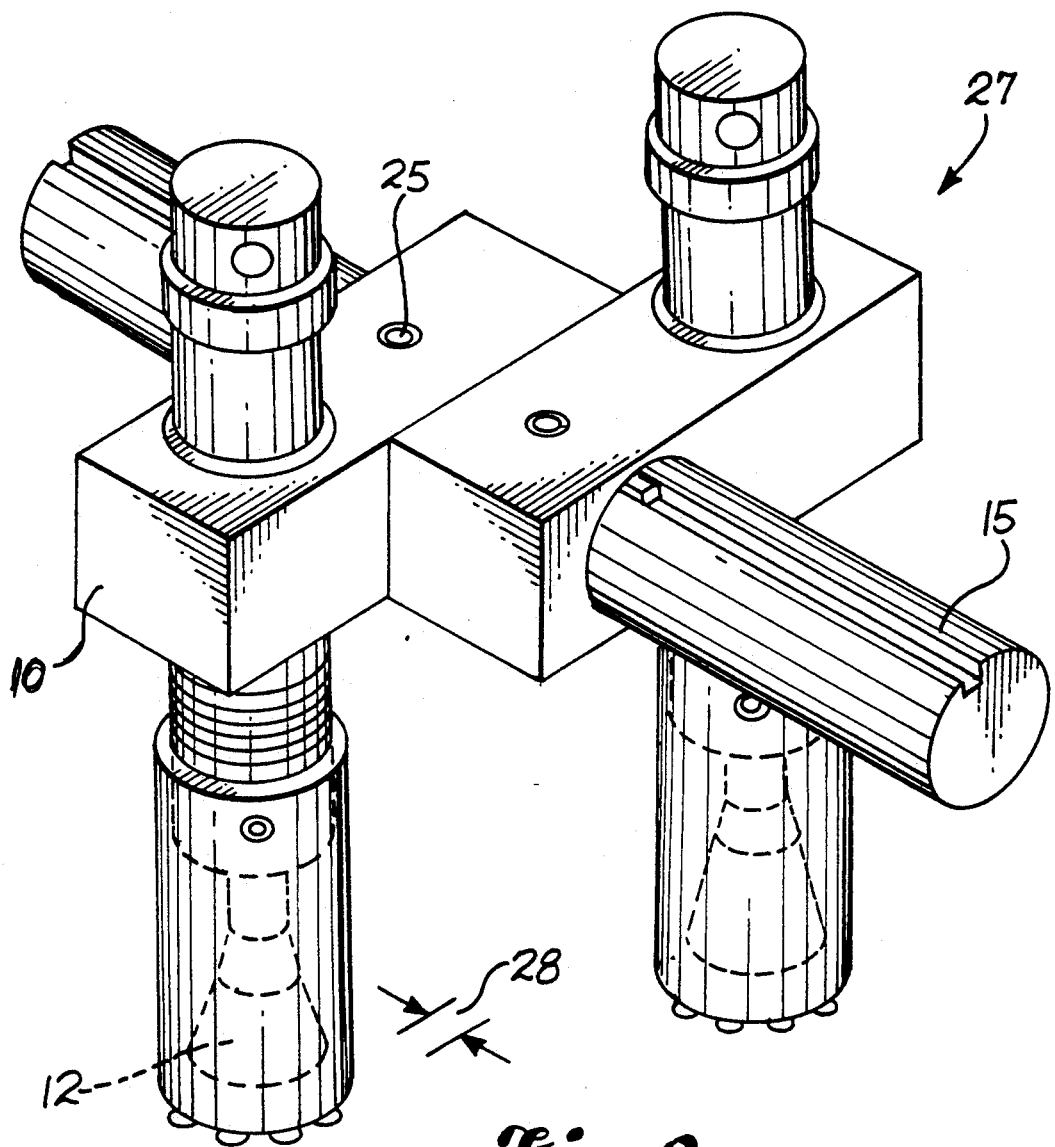
FIG. 2 is a perspective view of an assembly of two impacting tools joined together.

As shown in FIG. 2, two or more impacting tool setups (10) can be ganged together along pivoting shaft (15) to create an impact tool assembly (27). When this is done, the impacting heads (12) are set (via retention screw (25)) to create a Perforation/compaction overlap zone (28). This overlap (28) keeps ridges from occurring in the prepreg layup (5) as it is perforated and/or compacted.

Figure 3:
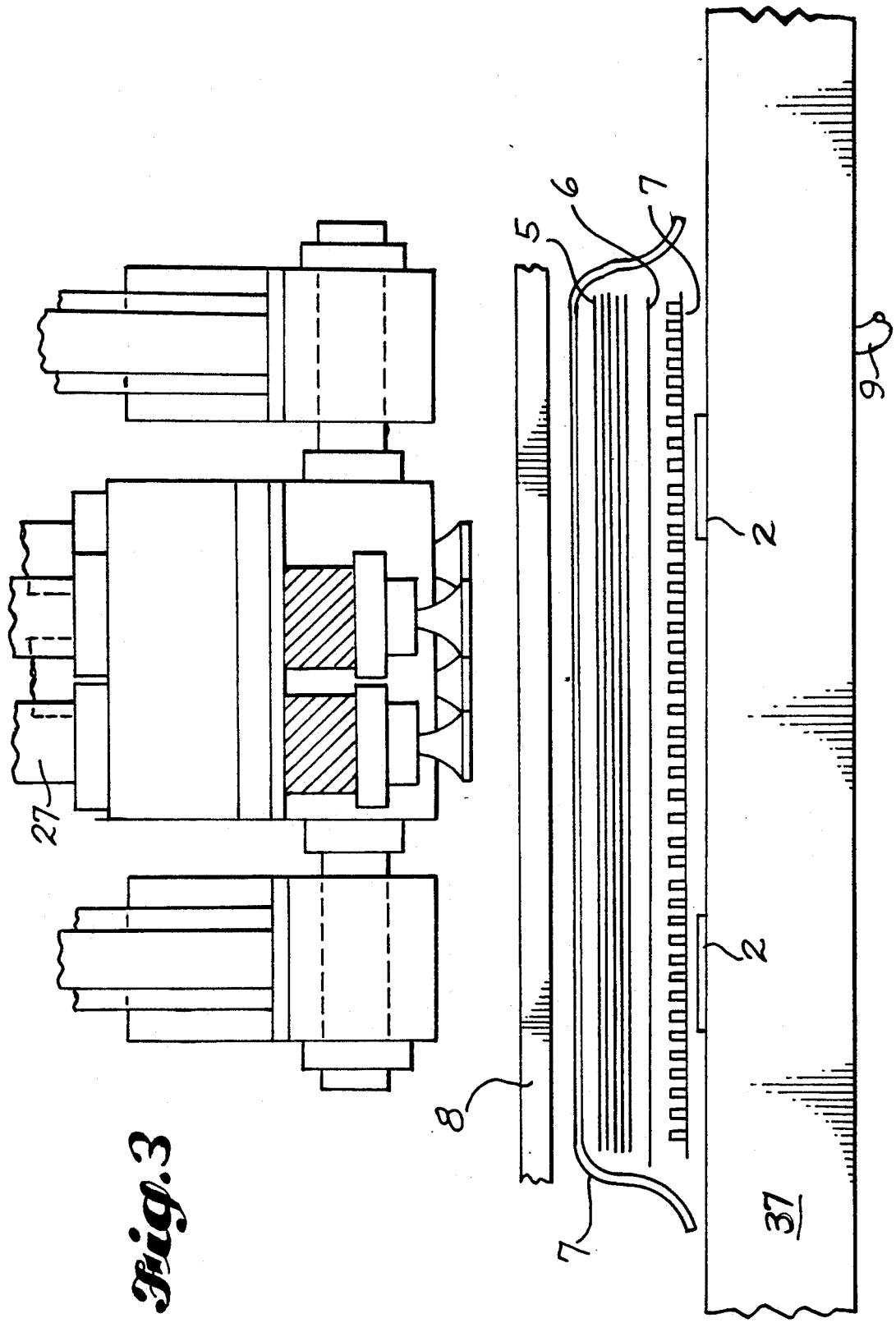
FIG. 3 is a sectional view of a prepreg laminate on a studded tool preparatory to compacting by an impacting tool assembly.

Referring to FIG. 3, pin mandrels (1) are affixed (in some manner such as double back tape (2)) to the layup tool (37). Complexities such as buildups, unperforated areas (3), etc. should be incorporated in the mandrels prior to placement. Joints (4) between mandrels can be incorporated in the mandrels prior to placement. Joints (4) between mandrels can be seam welded or filled with adhesive to minimize witness lines. Nest, the prepreg plies (5) are cut and laid onto the layup tool (37) in the orientation and manner called out in the engineering drawing. Adhesive plies (6) can also be added to the layup as required. The completed layup is then covered with an optional separator ply (7) (such as plastic film) and a pressure/vacuum transmitting material (8) (typically) ⅛ inch thick 50–60 durometer neoprene rubber). A vacuum (9) can be pulled over the layup using the pressure/vacuum pad (8). The vacuum in and of itself is insufficient to perforate the prepreg plies (5) and is not required for perforation, but when combined with the vibration, heat and oscillating impaction forces, optimal perforation/compaction is achieved.

Figure 4:
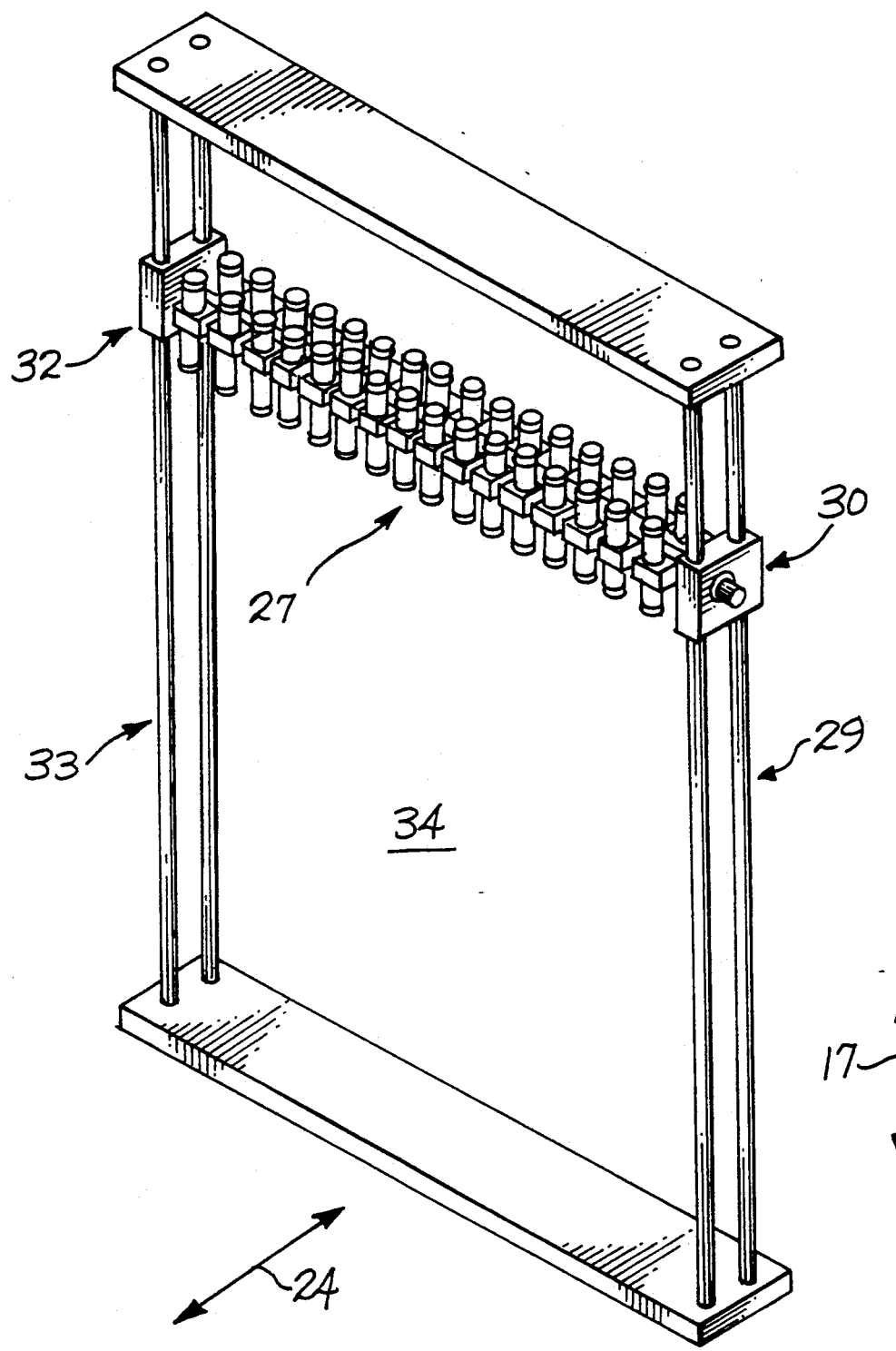
FIG. 4 is a perspective view of a perforating compacting apparatus which is moved with respect to a prepreg laminate to completely compact it against a tool.

FIG. 4 shows how an impact tool assembly (27) can be mounted to a linear positioning assembly (29) and rotational positioning assembly (30) to create a perforating/compacting apparatus (31). The linear positioning assembly (29) can be configured in either of the fashions described below:

1. Option 1: A pillow block assembly (32) confines the pivoting shaft (15) and allows the impact tool assembly (27) to float vertically (17) up and down along the linear slides (33) as the layup tool is linearly moved (24) under the apparatus. An optional lifting cylinder (not shown) can be attached to each pillow block assembly (32) to either counteract or intensify the weight of the impact tool assembly (27).

2. Option 2: A preprogrammed linear positioning system can be used to precisely move the impact tool assembly (27) along a vertical path that matches the layup tool configuration.

The rotational positioning assembly can be configured in either of the fashions described below:

1. Option 1: Self aligning bearings (34) allow the pivoting shaft (15) to rotate as needed to maintain the impacting tool assembly (27) normal to the layup tool (37). These bearings also allow one side of the shaft to position itself higher than the other side of the shaft if the layup tool surface is curved.

2. Option 2: A preprogrammed rotational positioning system can be used to precisely rotate the positioning shaft (15) along a path that matches the layup tool configuration.

The operations involved in creating a perforated engine nacelle panel by this invention are shown in FIGS. 6 through 10 and are listed below:

1. Locate pin mandrels on layup tool.
2. Cut out prepreg and layup all plies on layup tool.
3. Perforate/compact plies onto pin mandrel.
4. Bag part and autoclave cure.
5. Trim.

FIG. 5 shows how a full-size perforating/compacting apparatus can be used to fabricate a nacelle acoustic lining (35). The perforating/compacting apparatus (31) is stiffened with framing (36). The layup tool (37) is placed on the tool base (38) which is mounted on tool movement tracks (39). The tool is pulled through the perforating/compacting apparatus at a preset speed (current apparatus operation is 2½ feet per minute) as the impacting tool setup (27) oscillates (thus transmitting piercing pressure) and moves linearly and rotational) to follow the tool configuration. During this movement, vacuum pressure and heat may be applied (as detailed in FIG. 3 to the layup and vibration force may be utilized by initiating an industrial vibrating device (not shown) mounted to the tool base (38). When the tool reaches the end of the perforating/compacting zone (40) the operation is complete and the part can be sent to cure.

As noted herein, there exist other applications where a manual or semi-automated perforating/compaction process is warranted. On such application is the consilidation of many complex prepreg layers in the manufacture of a fiber reinforced I-beam. One method of doing this would involve using a rivet gun as the impacting tool. The pressure transmitting material could consist of either a piece of hand held rubber that is moved in conjunction with the impacting tool or rubber bonded to the impacting head. The operation of this setup would be similar to a fully automated apparatus but it would be more conducive for small awkwardly configured parts.

Listed below are innovations and improvements taught by this invention:

1. The perforating/compacting force can be delivered by a series of rapidly oscillating (1000 to 2000 blows per minute) impacting tools instead of a high capacity compression press.

2. The amount of force required to perforate can be reduced by combining vibratory motion with oscillating impacting pressure during the piercing process.

3. Required perforation force can be further reduced by the use of vacuum pressure.

4. Heating the perforating chamber (typically to between 100 and 200 F.) makes the composite layup less viscous and eases perforation.

5. The combination of oscillating impacting pressure, vibratory motion, heat and vacuum pressure greatly reduced the force required for perforation (i.e. from 200 lb/in2 to 25 lb/in2) and greatly improves the quality and amount of compaction obtained during perforation. It should be noted that oscillating impacting pressure can be used alone or in conjunction with either vibration, heat and/or vacuum forces to achieve perforation.

6. The perforating/compacting apparatus is capable of perforating an entire layup in one shot as opposed to other methods.

7. The perforating/compacting apparatus eliminates the need for vacuum debulking (the practice of pulling a vacuum on each thermoset play immediately after it is placed on the layup tool to remove trapped air from between the plies). One potential offshoot use for this apparatus would be for use on standard thermoset lay-ups without perforations as a means of compacting the plies. This would allow a large number of plies to be laid up at once and subsequently compacted, thus eliminating the need for ply-by-ply debulking.

8. The impacting tools can be arranged linearly with each tool's perforating/compacting zone slightly overlapping the adjoining tool's zone. This arrangement can be made to transverse the entire width of the tool.

9. The linear expanse of impacting tools can be made to travel across a given tool to achieve perforation of the layup in a single step continuous operation. This movement can be in the form of moving the impacting tools over the layup tool or moving the layup tool under the impacting heads.

10. The compacting force can be tailored to follow complex curvatures (widthwise and/or lengthwise curvature), thus allowing for perforation/compaction directly on the layup tool. This motion can be achieved by linear positioning systems or translation of the linear motion (see step 8) to vertical up and down movement.

11. The apparatus can be adapted to perforate/compact extremely large parts by moving the tool under a relatively small apparatus that spans the width of a part.

12. Each impacting tool can have the following innovative capabilities:
  —Self-aligning—A series of roller bearings attached to the bottom of the impacting heads and a self-aligning impacting head mounting bearing insures the compacting force is applied normal to the layup tool or studded mold.
  —Vertical movement. Each head is free to slide up and down in relationship to the other heads (thereby following dips and bumps in the tool).
  —Standoff. The roller bearings maintain a constant standoff (thus insuring resistance-free oscillation) between the layup and the impacting tools.
  —Adjustment. Impacting tool mounting is flexible thus allowing up-and-down and side-to-side adjustment as needed to optimize performance.

13. The perforating/compacting apparatus is layup material independent. Different resin systems (epoxy, BMI, PMI-15, etc.) and reinforcements (plain weave 8-harness satin weave, unidirectional, etc.) can be utilized with equal east.

14. The pressure transmitting material (typical ⅜ inch 50 to 60 durometer rubber) can also be used to pull a vacuum over the thermoset layup.

15. The studded tools can be placed directly on the layup tool, (one method would be to use double back tape) fitted together (by seam welding or adhesive bonding) and perforation can be accomplished in shape on the tool.

16. The perforation/compacting apparatus controls can tie the perforation forces and tool movements together to make the perforating/compacting operation a one-step continuous fully automated process. Also, the potential exists for part specific semi-automated and manual equipment.

17. The impacting tools can be arranged into rows centered around a common rotatable shaft. the shaft rotation can be controlled by a rotational positioning mechanism or it can be self aligning (i.e., caused to move by the movement of the impacting tools motion floating on roller bearings) over the layup tool. The two rows of impacting tools allow perforating head overlap and also create a teeter-totter effect where the force of one row of guns is offset by the force of the other row of guns.

18. A perforated panel can be perforated and compacted with buildups nonperforated areas, etc. without affecting the apparatus's operation.

In summary, the apparatus of this invention is capable of rapidly perforating and compacting a full layup of uncured composites onto a reusable studded tool or pin mandrel in a one-step continues operation, thereby creating perforated skins with the best mix of high strength, light weight and low costs.

The composite reinforcing fibers are not broken during perforation. Rather, they are pushed around the holes and remain continuous.

The holes are molded into the composite not cut into it. Thus, the resin is cured in place and reinforcing fibers are not exposed.

Real world part complexities (double curvature, reverse curvature, buildups, etc.) can be accommodated and perforated/compacted in one large continuous skin. Also, a variety of composite reinforcements (plain weave, 8-harness satin weave, etc.) and resin types (epoxy, BMI, PMR-15, etc.) can be perforated/compacted with equal ease.

One off-shoot use for the perforating/compacting method and apparatus would be in the field of thermoset layup debulking. The potential exists to greatly reduce the time required and improve the quality of pre-preg compaction (compared to the ply-by-ply vacuum debulking procedures predominantly used within the industry). Specialized applications such as radius filler installation could also benefit through the implementation of this technology.

While our invention has been described in terms of specific embodiments thereof, other forms may be readily adapted by one skilled in the art. Accordingly, the scope of the invention is limited only in accordance with the following claims.

We claim:

1. A method of making a perforated structural laminate comprising providing a curved mold in a contour of said laminate having a plurality of protruding studs; laying-up a plurality of fiber reinforced, resin prepreg sheets onto the curved studded mold; moving said mold and at least one rapidly oscillating impacting tool relative to each other; impacting said prepreg sheet with said at least one rapidly oscillating impacting tool through a pressure transmitting material said impacting tool swivels and floats vertically as said mold moves relative to said tool to align said tool substantially perpendicular with said mold to force said prepreg around said studs without injuring the reinforcing fibers and to achieve substantially full density; partially curing said impacted sheets to a point at which no further resin flow occurs upon heating; removing the partially cured sheets from said mold; and further heating said sheets to achieve a final cure and create said perforated structural laminate.

2. The method of claim 1 where the impacting tool is a specially adapted rivet gun having an enlarged impacting head mounted on a pivoting shaft, said pivoting shaft allowing said head to swivel and float vertically to align said head perpendicular to the surface of a said prepreg sheet.

3. A method of making a perforated acoustical lining for a jet engine nacelle said method comprising providing a curved mold in a contour of said nacelle having a plurality of protruding studs; laying-up a plurality of fiber reinforced, resin prepreg sheets onto the curved studded mold; moving said mold and a plurality of rapidly oscillating impacting tools relative to each other; impacting said prepreg sheets with said plurality of rapidly oscillating impacting tools through a pressure transmitting material said impacting tools swivel and float vertically as said mold moves relative to said tools to align said tools substantially perpendicular with said mold to force said prepreg around said studs without injuring the reinforcing fibers and to achieve substantially full density; partially curing said impacted sheets to a point at which no further resin flow occurs upon heating; removing the partially cured sheets from said mold; and further heating said sheets to achieve a final cure and create said perforated structural engine nacelle.

4. The method of claim 3 where the impacting tools are specially adapted rivet guns having an enlarged impacting head mounted on pivoting shafts, said pivoting shafts allowing said heads to swivel and float vertically to align said heads perpendicular to the surface of a said prepreg sheet.

5. The method of claim 4 where said rivet guns are ganged together along a pivoting shaft.

* * * * *